US009967367B2

(12) United States Patent
Gulik et al.

(10) Patent No.: US 9,967,367 B2
(45) Date of Patent: May 8, 2018

(54) METHOD AND SYSTEM FOR PREDICTIVELY PROVIDING SOFTWARE

(71) Applicant: Utomik BV, Eindhoven (NL)

(72) Inventors: Rob Van Gulik, Eindhoven (NL); Mark Schroders, Eindhoven (NL)

(73) Assignee: UTOMIK BV, Eindhoven (NL)

( * ) Notice: Subject to any disclaimer, the term of this patent is extended or adjusted under 35 U.S.C. 154(b) by 136 days.

(21) Appl. No.: 14/817,872

(22) Filed: Aug. 4, 2015

(65) Prior Publication Data

US 2017/0041434 A1   Feb. 9, 2017

(51) Int. Cl.
*H04L 29/08* (2006.01)
*H04L 29/06* (2006.01)
*H04L 12/26* (2006.01)

(52) U.S. Cl.
CPC .......... *H04L 67/34* (2013.01); *H04L 65/4069* (2013.01); *H04L 67/2847* (2013.01); *H04L 67/325* (2013.01); *H04L 43/0894* (2013.01)

(58) Field of Classification Search
CPC .. H04L 67/34; H04L 48/0894; H04L 65/4069
See application file for complete search history.

(56) References Cited

U.S. PATENT DOCUMENTS

| | | | | |
|---|---|---|---|---|
| 4,807,148 A | * | 2/1989 | Lacey | G01N 30/8603 702/32 |
| 5,881,231 A | * | 3/1999 | Takagi | H04L 12/2602 370/235 |
| 7,076,563 B1 | * | 7/2006 | Yamanaka | H04L 12/1421 709/233 |
| 7,908,391 B1 | | 3/2011 | Satish et al. | |
| 2002/0087963 A1 | | 7/2002 | Eylon et al. | |
| 2012/0005310 A1 | * | 1/2012 | Obata | G06F 9/45537 709/219 |
| 2016/0080821 A1 | * | 3/2016 | Makhijani | H04N 7/17318 725/5 |

* cited by examiner

*Primary Examiner* — Larry Donaghue
(74) *Attorney, Agent, or Firm* — Graeser Associates International Inc; Dvorah Graeser

(57) ABSTRACT

A computer-implemented method of predictively providing a part of a software application over a network to one recipient computer of plural recipient computers, each of the recipient computers being configured for executing the software application without having in its possession the entire software application, the method comprising acquiring a prediction of an access time of the part and a prediction of a provisioning time of the part over the network and providing the part ahead of the access time minus the provisioning time to the one recipient computer.

7 Claims, 2 Drawing Sheets

METHOD AND SYSTEM FOR PREDICTIVELY PROVIDING SOFTWARE

FIELD OF THE INVENTION

The invention relates to a method of predictively providing a part of a software application over a network to one recipient computer of plural recipient computers, each of the recipient computers being configured for executing the software application without having in its possession the entire software application.

BACKGROUND OF THE INVENTION

In the digital media landscape, a change is occurring from traditional downloading to streaming. Streaming allows for quicker listening to or viewing content, although files are (usually) not retained as a whole on the receiving computer. This saves storage on the receiving computer, and also allows for business models where one pays for each time the content is streamed.

For linear content such as movies, music or television shows implementing streaming is conceptually trivial. But transferring this idea to non-linear content, in particular software applications such as games, is hard because it is unknown in advance how the content is going to be used. Current state of the art systems try to overcome this difficulty by buffering a large part of the content that is expected to be used first and long enough so that the rest of the content can be downloaded before the user reaches the unbuffered part. For example, in the context of a level-based game, such systems might buffer level 1 up to 4, so that level 5 and further can be downloaded before the player reaches level 5.

While this approach is similar to the concept of buffering linear content, the size of the required buffer is much larger, leading to unacceptably long waiting times before the content can be used as well as large storage requirements for storing the buffered data. In addition, because of the many different ways in which the content can be used, often some part of the content is not contained in the buffer, which may lead to performance drops during application usage or even to a crash if the part is essential to continued operation of the application. Further, existing systems only work successfully on a limited set of applications, since determining what the initial content will be is often difficult and highly dependent on the type of application.

Many prior art approaches exist that seek to improve on this situation. Some examples are U.S. Pat. No. 7,240,162, U.S. Pat. No. 8,095,679, U.S. Pat. No. 8,613,673, U.S. Pat. No. 8,468,175, U.S. Pat. No. 8,539,038 and US 2012/0167075. The general approach is to predict in some manner which content will be accessed by the user next, so this content can be streamed to the receiving computer just when it is necessary. However, most of these approaches focus on content contiguity. That is, a prediction is made based on paths through the software, e.g. when level 1 is completed one will go to level 2 or perhaps to bonus level A. Or, when file A has been read then the content of file B is likely next, as B contains icons needed by software routines in A. In the context of games, predicting such paths is highly complex as a large and complex game may have a very extensive branch structure. This may make it very time-consuming to make a decision, or even render it technically impossible.

SUMMARY OF THE INVENTION

The invention seeks to improve on the above by providing a method that takes the estimated time of execution of parts of the software into account.

The invention achieves this object in a method comprising acquiring a prediction of an access time of the part and a prediction of a provisioning time of the part over the network and providing the part ahead of the access time minus the provisioning time to the one recipient computer. Instead of trying to determine what the 'first part' of the content is (by relying on e.g. the linearity of usage), the invention splits up the content in small chunks and predicts, for each chunk, when the chunk is going to be accessed by the client system for the first time. Given the size of a chunk, the available bandwidth and the predicted first time access, it is possible to calculate when the download for that chunk should start for it to become available (just) before it is actually required. Combining these predictions for each chunk of the application, the method of the invention provides information on exactly what to download before the application starts, what to download after that, and when to start additional downloads.

In an embodiment the prediction of the provisioning time is acquired based on factors including the average download speed to the recipient computer and the size of the part. These factors weigh heavily in the estimate needed in the invention and are easy to acquire.

Preferably in this embodiment the prediction of the provisioning time is adjusted periodically based on a change in an estimate of download speed. Download speeds may vary to a large extent over time, and thus it is advantageous to adjust this prediction from time to time. A simple option to make the estimate is to calculate the average download speed.

Preferably in this embodiment the average download speed is calculated after reserving a part of the available bandwidth to the recipient computer. This has the advantage that not all bandwidth is consumed, which may hamper other applications or systems that need to use the network to download (or upload) data.

In a further embodiment the prediction of the access time is acquired based on an estimated first access time derived from actual first access times from a significant subset of the plural recipient computers, for example as an average of those actual access times. It is envisaged that the method will be employed in practice by a great multitude of client systems, as with large-scale online games and software-as-a-service applications. This allows the operator of a server system performing the method for these client systems to observe first time access times from a subset of these clients and derive an estimate from that. The more client systems are observed, the better the estimate will be.

Preferably in this embodiment the prediction of the access time is calculated using an error bound on said estimated first time access (FTA). This provides for a safe prediction, that is, a time that would be early enough (e.g. before the chunk will actually be used for the first time) for a given percentage of the population of client systems.

The invention further provides for a system corresponding to the method of the invention. The invention further provides for a computer-readable storage medium comprising executable code for causing a computer to perform the method of the invention.

BRIEF DESCRIPTION OF THE DRAWINGS

In the drawings.

In the figures, same reference numbers indicate same or similar features. In cases where plural identical features, objects or items are shown, reference numerals are provided only for a representative sample so as to not affect clarity of the figures.

DETAILED DESCRIPTION OF CERTAIN EMBODIMENTS

Figure 1:
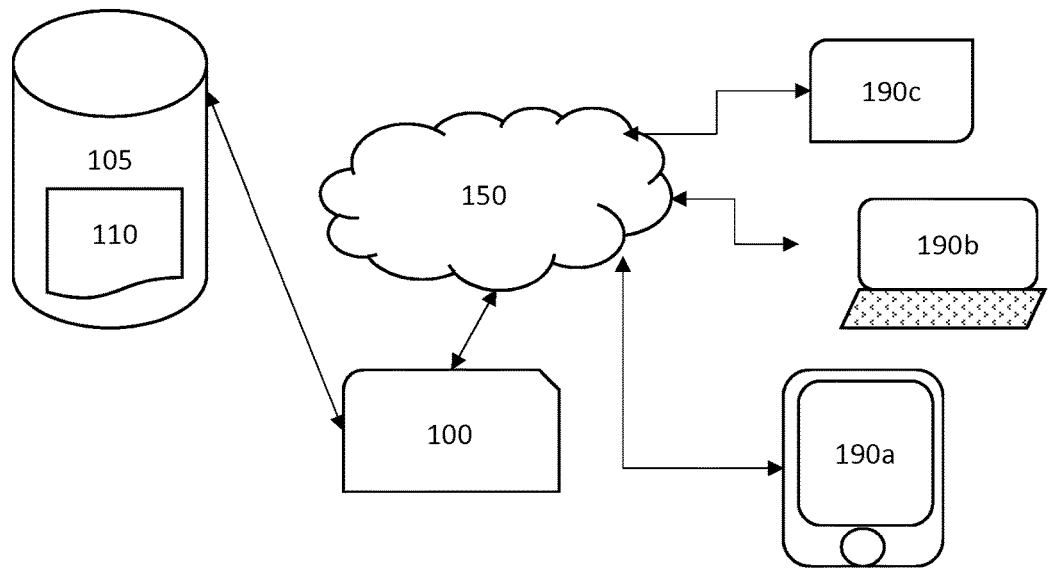
FIG. 1 schematically illustrates an arrangement comprising a server system and plural client systems.

FIG. 1 schematically illustrates an arrangement comprising a server system 100 and plural client systems 190a, 190b, 190c. The server 100 and clients are connected over a network 150 such as the internet. The server 100 has access to storage medium 105 on which is stored a software application 110. The clients 190a, 190b, 190c are configured to download this software application 110 from the server 100 and to execute the application 110 without having in its possession the entire software application. The skilled person will recognize this is a simple set-up that may easily be extended as technology or demand requires. For example, instead of facilitating a download from the server 100, one or more different download servers could be set up, e.g. as a Content Distribution Network (CDN). Instead of a single server, a cluster of servers working together could be set up. As such, this set-up is well known and will not be elaborated upon further.

To facilitate the above execution of the application 110 by the clients 190a, 190b, 190c, the server 100 is configured for dividing the application 110 into small parts, hereafter known as chunks. The size of the chunks can be chosen arbitrarily. Typically a balance must be struck between larger and smaller. The larger a chunk is, the higher the chance its download might fail, e.g. due to network problems. However, the smaller a chunk is, the more chunks need to be downloaded. In many networking arrangements a significant overhead is associated with many small downloads.

To start execution of application 110, a certain minimum number of chunks will be required. Determining which chunks are required, depends on the application. Factors to employ to make this determination include the available bandwidth and the total time that a user has already spent inside the application 110 before this session. After downloading these chunks, the application is started, and the client system keeps downloading chunks in the background. The client system in question may have acquired certain chunks beforehand, e.g. local caching or stored on a permanent storage medium. If such chunks are already available, they may be loaded into main memory before the application 110 requests them to increase application loading speed.

Figure 2:
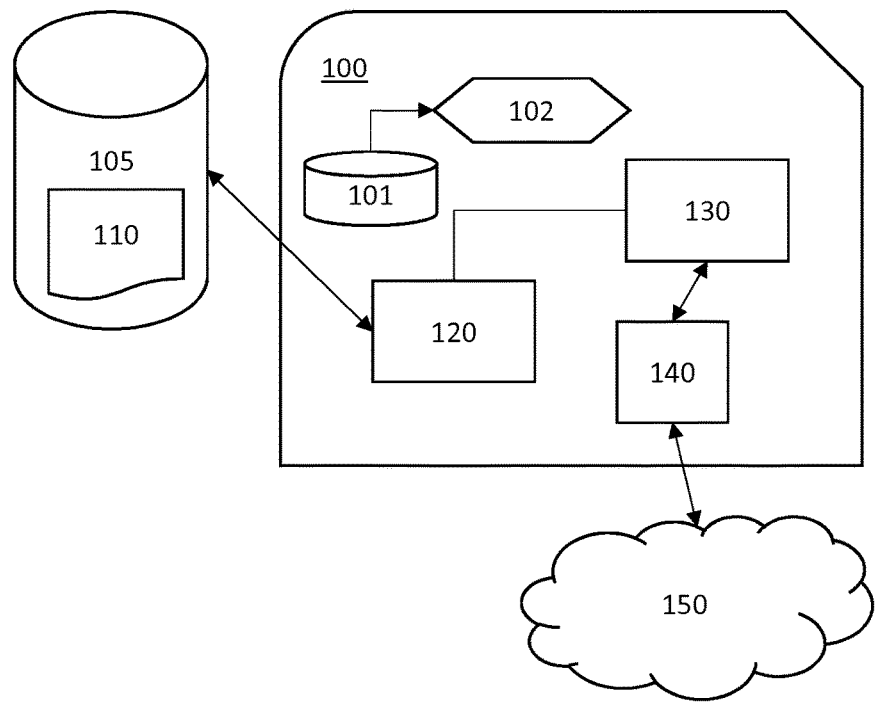
FIG. 2 shows the server system in more detail.

FIG. 2 shows the server system 100 in more detail. The server 100 comprises non-volatile storage medium 101 for storing software to cause the server to function, and a processor for executing this software. In accordance with the invention, a predictor 120 in the system 100 acquires for each chunk a prediction of an access time of the chunk as part of the application 110 and a prediction of a provisioning time of the part over the network 150. Based on these two predicted times, a transmission module 130 can provide the chunk to each of the client systems 190a, 190b, 190c ahead of the access time minus the provisioning time. This allows the client system in question to continue execution of the application 110.

Preferably this prediction is acquired based on factors including the average download speed to the client systems 190a, 190b, 190c and the size of the chunk. In an embodiment, data is collected on the client systems during execution of the application 110 by hooking the file system. Each time a file is read for the first time, a log entry is created containing an identification for the chunk and the time of access. At the end of a session, the total time spent is also added to the log, and the log is sent to the server 100.

The server 100 thus receives first time access values for plural uses of the application 110, and perhaps even for each version of the application. The predictor 120 may use the available first time access data to generate a first time access (FTA) prediction value for each chunk of the application 110. If data is collected for different versions, then preferably FTA values for the newest version of the application 110 are used.

If no FTA data is available for a chunk, a default value may be used. This default value could be set to zero, which implies it must be downloaded immediately. While this is suboptimal, as the chunk may not in fact be needed immediately, it is the safest prediction and further allows the clients 190a, 190b, 190c to report back the actual access time, which in turn allows the server 100 to calculate a prediction based on these reports.

In an embodiment the predictor 120 is configured to adjust the prediction of the provisioning time periodically based on a change in an estimate of the download speed, for example the average download speed. Input for this estimate is communicated by the transmission module 130 which effects the transmission of data to the client systems 190a, 190b, 190c. Alternatives include a percentage of the average and a lower bound of the average.

In a further embodiment the client systems 190a, 190b, 190c are configured to measure the available bandwidth, so they may postpone downloading some of the chunks if available bandwidth has increased, or warn the user if bandwidth has decreased and the prediction may be incorrect because of this.

Preferably the average download speed is calculated after reserving a part of the available bandwidth to the recipient computer. To this end, the server 100 may be provided with a bandwidth management module 140 that manages the access to bandwidth between server 100 and clients 190a, 190b, 190c. The module 130 may be driven by requests from clients 190a, 190b, 190c to make the reservations.

Preferably the prediction of the access time is acquired based on an estimated first access time derived from actual first access times from a significant subset of the plural recipient computers 190a, 190b, 190c. By employing an estimate such as an average, it is ensured that the prediction is most likely to be correct. The estimate could be adjusted over time, as explained above with reference to the provisioning time. Alternatives to averaging include recording a lowest and upper bound of the actual first access times and incrementally adjusting a probability distribution based on the actual first access times.

This prediction is preferably calculated using an error bound on said average first time access. For example, a normal distribution could be fitted on the received FTA data for a chunk, and the predicted FTA value could be the mean minus two times the standard deviation, which would be a value that is early enough for more than 97.5% of the population, given that the FTA for this chunk follows a normal distribution. A person having ordinary skill in the art will notice that there are many alternatives to using the normal distribution. To improve the calculation of a suitable safe value for the predicted FTA, the error bound of the probability distribution can be used; the mean and standard deviation for the FTA of a chunk will improve as the sample set gets larger.

Figure 3:
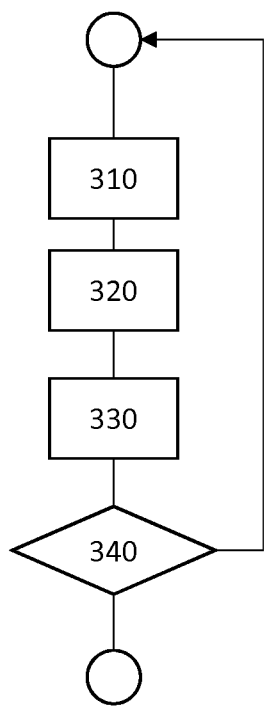
FIG. 3 schematically illustrates the method of the invention.

FIG. 3 schematically illustrates the method of the invention. As explained above, under the method a part of software application 110 is predictively provided over network 150 to one of plural recipient computers 190a, 190b, 190c, each of the recipient computers being configured for executing the software application without having in its possession the entire software application.

The method starts in step 301. In step 310, a prediction of an access time of the part is acquired. As disclosed above, this step is performed by predictor 120. Next, in step 320 a prediction of a provisioning time of the part over the network 150 is acquired as well, again performed by the predictor 120.

In step 320, a first time access (FTA) prediction value for each chunk of the application 110 is generated. This step is optional and allows for the acquisition of the prediction based on factors including the average download speed to the client systems 190a, 190b, 190c and the size of the chunk.

In step 330, performed by the transmission module 130, the part is provided ahead of the access time minus the provisioning time to the one recipient computer.

The method then at 340 either terminates or repeats itself for as long as chunks are to be downloaded to the one client computer.

Figure 4:
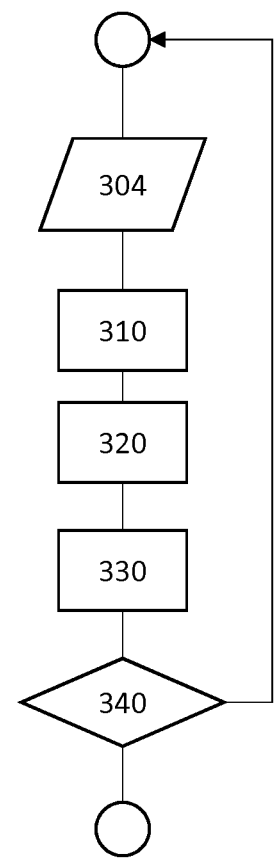
FIG. 4 schematically illustrates a further embodiment of the method of the invention.

FIG. 4 schematically illustrates a further embodiment of the method of the invention. Steps 310, 320 and 330 are as explained with reference to FIG. 3. New is step 305, which occurs prior to step 310. In this step, a change in an estimate of the download speed is noted, causing the predictor 120 to adjust its prediction of the provisioning time in step 310.

CLOSING NOTES

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

Some or all aspects of the invention may be implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A computer-implemented method of predictively providing a part of a software application over a network to one recipient computer of plural recipient computers, each of the recipient computers being configured for executing the software application without having in its possession the entire software application, the method comprising acquiring a prediction of an access time of the part expressed as either a number of seconds relative to a current time or as an absolute time, and a prediction of a provisioning time of the part over the network expressed as either a number of seconds relative to a current time or as an absolute time, and providing the part ahead of the access time minus the provisioning time to the one recipient computer, said prediction of the access time being acquired based on an estimated first access time derived from actual first access times from a significant subset comprising a plurality of the plural recipient computers.

2. The method of claim 1, in which the prediction of the provisioning time is acquired based on factors including the average download speed to the recipient computer and the size of the part.

3. The method of claim 2, in which the prediction of the provisioning time is adjusted periodically based on a change in an estimate of download speed.

4. The method of claim 2 or 3, in which the average download speed is calculated after reserving a part of the available bandwidth to the recipient computer.

5. The method of claim 1, in which the prediction of the access time is calculated using an error bound on said estimated first time access.

6. A computer system for predictively providing a part of a software application over a network to one recipient computer of plural recipient computers, each of the recipient computers being configured for executing the software application without having in its possession the entire software application, the system comprising means for acquiring a prediction of an access time of the part expressed as either a number of seconds relative to a current time or as an absolute time, and a prediction of a provisioning time of the part over the network expressed as either a number of seconds relative to a current time or as an absolute time, and means for providing the part ahead of the access time minus the provisioning time to the one recipient computer, said prediction of the access time being acquired based on an estimated first access time derived from actual first access times from a significant subset comprising a plurality of the plural recipient computers.

7. A non-volatile storage medium comprising executable code for causing a computer to perform the method of claim 1.

* * * * *